Oct. 14, 1952   R. N. FALGE   2,613,575
REARVIEW MIRROR ASSEMBLY AND MOUNTING MEANS
Filed March 25, 1950
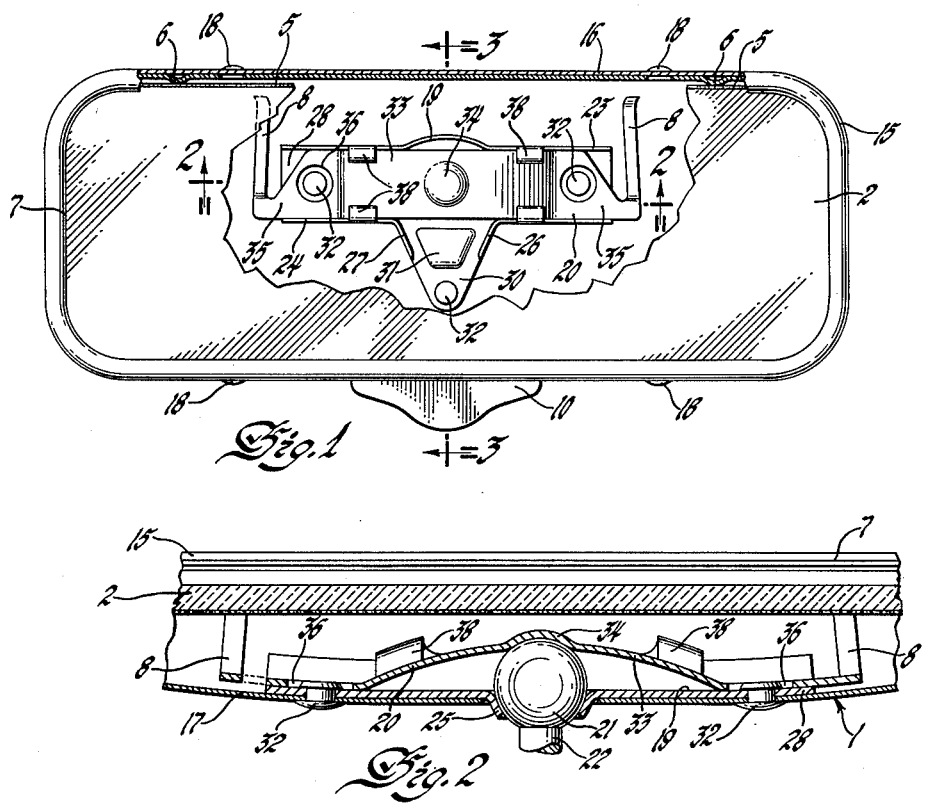
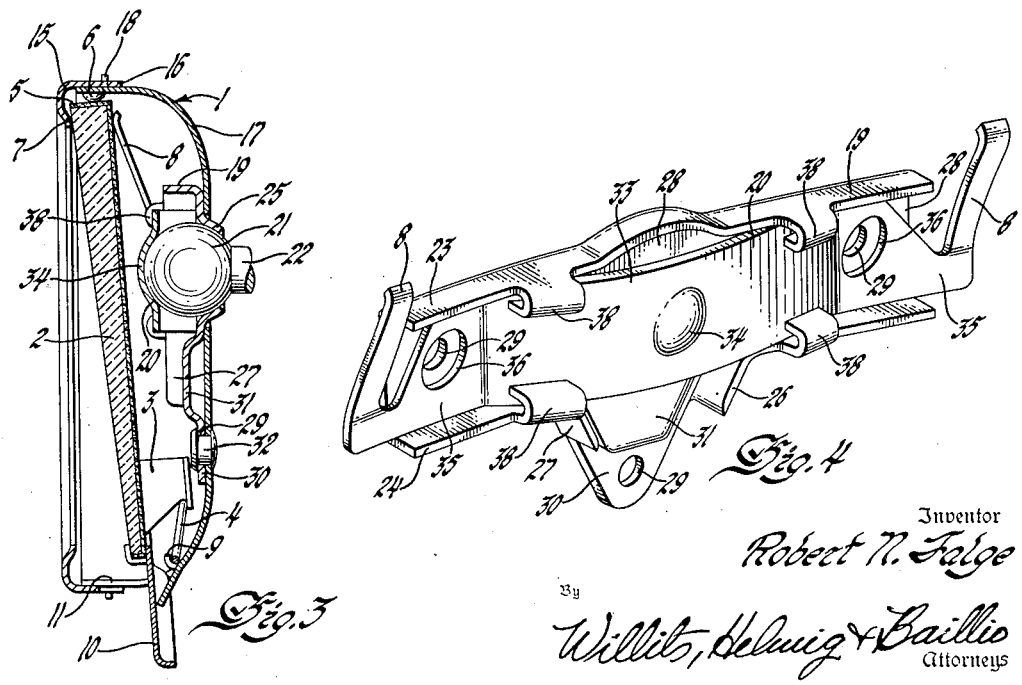
Inventor
Robert N. Falge
By
Willits, Helmig & Baillio
Attorneys Patented Oct. 14, 1952

2,613,575

UNITED STATES PATENT OFFICE 2,613,575

REARVIEW MIRROR ASSEMBLY AND MOUNTING MEANS

Robert N. Falge, Anderson, Ind., assignor to General Motors Corporation, Detroit, Mich., a corporation of Delaware Application March 25, 1950, Serial No. 151,919

3 Claims. (Cl. 88—98)

1

This invention relates to rear view mirrors and particularly to means for pivotally connecting the same to its supporting bracket.

The invention is particularly directed to an improvement of the means for connecting the mirror housing to the ball stud disclosed in Patent 2,469,207 to Gordon E. Roedding. In the latter construction the ball end of the stud is clamped directly between the mirror back shell and a spring plate which is riveted to the casing on either side of the ball. It has been found that with this type of ball clamping considerable strain is imposed upon the shell, resulting in a certain amount of bulging of the shell adjacent the ball plus an objectionable dimpling of the shell at the rivets securing the spring strap. Further, in order to obtain sufficient rigidity of the shell without excessively increasing its thickness and hence the over-all weight of the mirror assembly it has been necessary to form stiffening ribs in the shell, which ribs are considered to detract from the ornamental appearance of the mirror assembly.

The mirror assembly in accordance with the instant invention avoids the aforementioned objections by providing a stiffener plate between the mirror back shell and the ball and securing the spring plate to the stiffener plate independently of the shell, thereby relieving the shell from bending stresses incident to the clamping of the ball. Stress on the casing is therefore limited to that incident to supporting the weight of the mirror assembly and may be made substantially thinner than that of the previous construction and the stiffening ribs may be dispensed with. In addition to the resulting improved appearance and reduced thickness of the mirror back shell, the reduction in stress and rigidity of the shell has been found to greatly reduce vibration of the mirror during vehicle operation.

In the drawing:

Figure 1 is a front elevational view of a mirror constructed in accordance with the instant invention, with parts broken away and in section.

Figure 2 is an enlarged section taken substantially on line 2—2 of Figure 1.

Figure 3 is an enlarged section taken substantially on line 3—3 of Figure 1.

Figure 4 is an enlarged perspective view of the stiffener plate and spring plate in their relative positions in the mirror assembly.

The numeral 1 designates generally a mirror casing within which is mounted a wedge shaped mirror element 2 arranged to be angularly tilted between two extreme reflecting positions in the manner described in the aforementioned patent.

2

Briefly, the mirror element 2 is supported in a cradle 3 which is urged upwardly by a wire spring 4 so that the upper edge 5 of the mirror element bears at all times against a pair of depressed bearing points 6 formed in the casing 1. Resiliently urging the upper portion of the mirror element against the bezel 7 of the casing so as to locate the upper edge 5 opposite the bearing points 6 are a pair of spring arms 8. The wire spring 4 seats in a turned up portion 9 of the casing, and when the handle portion 10 of the cradle is moved to the left from its position shown in Figure 3 the wire spring first yieldingly opposes the movement and then assists the movement as the mirror element passes over its mid-travel position, the extreme limiting positions of the mirror element being fixed by the length of the slot 11 in the casing through which the handle portion projects.

The casing 1 includes a mirror frame 15 forming the bezel 7 and open at its rear end 16 into which is telescopically fitted a back shell 17 having turned up tabs 18 which pass through apertures in the frame 15 and serve to secure the frame 15 and shell 17 together. Assembled to the shell 17 are a stiffener plate 19 and spring plate 20 between which the ball end 21 of the mirror mounting stud or bracket 22 is clamped. The stiffener plate which may be suitably formed as a sheet steel stamping is of forwardly open channel section having a web 28 in abutment with the inner face of the shell 17 and upper and lower channel flanges 23 and 24 slidably embracing the upper and lower edges of the spring plate 20. The mounting stud 22 extends through suitable apertures in the shell 17 and stiffener plate 19 and the metal of the stiffener plate immediately surrounding its aperture forms a partial spherical bearing seat or socket 25 for the ball 21. The lower channel flange 24 of the stiffener plate terminates in bent down portions 26 and 27 on opposite sides of the ball 21, and interconnecting these portions is a downward extension 30 of the channel section web 28 having a stiffening embossment 31. Holes 29 are provided both in each end of the web 28 and its extension 30 for passage of rivets 32 which secure the stiffener member to the shell 17.

The spring plate 20 has a bowed portion 33 intermediate its ends with a central embossment 34 generally spherical in shape to form a seat for socketing the stud ball end 21 in opposing relation to the seat 25 formed in the stiffener plate. At opposite ends of the bowed portion 33 are provided substantially flat feet 35 which slidably abut the channel web 28 of the stiffener plate and are provided with clearance holes 36 for the ends of the rivets. The aforementioned spring arms 8 which bias the upper portion of the mirror element forwardly against the bezel 7 are formed integrally with the feet 35. As means for interconnecting the bowed spring plate portion 33 and the stiffener plate 19 so as to clamp the ball 21 between them there are provided a plurality of tab-like projections 38 on the upper and lower channel flanges. These projections 38 are bent inwardly toward each other and then rearwardly into abutting engagement with the convex face of the bowed portion 33, and serve to maintain the spring plate under tension so that the ball 21 is frictionally clamped between the ball sockets 25 and 34.

The stiffener plate 19 has sufficient rigidity by reason of its channel flanges 23 and 24 that no substantial bending of the back shell 17 occurs as the result of the clamping force exerted on the ball 21. Hence the back shell 17 may be made of relatively light gage sheet metal such as soft brass which will tend to dampen vibration of the mirror assembly on the ball stud 22. In addition, the back shell requires no reinforcing ribs and may be given a smooth configuration which enhances the external appearance of the mirror assembly. No strain other than the weight of the mirror assembly will be transmitted from the ball to the back shell, consequently the rivets 32 will not tend to cock and cause dimpling of the shell.

The stiffener plate and spring plate described cooperated in providing a sturdy assembly which is free from rattles, and the tab-like projections 38 of the stiffener plate are adapted for convenient resetting to increase the spring tension or take up wear between the ball and the ball sockets, should such be necessary after extended use of the mirror in operation.

I claim:

1. In combination with a hollow housing, a ball ended stud accommodating universal adjustment of the housing, means carried by the housing for clamping to the ball including a stiffener plate and a bowed spring plate engaging opposite surfaces of the ball, opposite ends of the spring plate being in sliding engagement with the stiffener plate, and abutments on the stiffener plate intermediate the ball and said spring ends urging the spring plate into frictional engagement with the ball and said spring ends in sliding engagement with the stiffener plate.

2. In combination with a sheet metal housing apertured to receive the ball end of a mounting stud, a pair of ball clamping members within the housing engaging opposite sides of the ball, one of said members being substantially channel shaped and anchored to the housing, the other of the members comprising a bowed leaf spring having ends received by and slidably engaging the web of the channel section member, opposite flanges of the channel section member being provided with intermediate said spring ends with tabs retaining the spring compressed against the ball.

3. In a mirror assembly, a housing, a mirror suspended within the housing and tiltable to different angular positions therein about one side edge of the mirror, a pivot point on the housing for said mirror edge, means for positioning the mirror edge opposite said pivot point including a pair of spring arms resiliently pressing against the back of the mirror adjacent said mirror edge, a stiffener plate secured to the inner wall of the housing rearwardly of the mirror and having a ball seating portion, a bowed spring integrally connecting said spring arms and having a ball seating portion opposite the ball seating portion of the stiffener plate, a supporting ball between said ball seating portions, said stiffener plate having portions embracing the spring laterally of said ball seating portions and forcing the bearing portion of the spring into frictional engagement with the ball.

ROBERT N. FALGE.

REFERENCES CITED

The following references are of record in the file of this patent:

UNITED STATES PATENTS

| Number | Name | Date |
|---|---|---|
| 2,161,433 | Ritz-Woller | June 6, 1939 |
| 2,325,615 | La Hodny et al. | Aug. 3, 1943 |
| 2,469,207 | Roedding | May 3, 1949 |
| 2,502,699 | Budreck | Apr. 4, 1950 |